(12) United States Patent
Gundling (10) Patent No.: US 7,941,304 B2
(45) Date of Patent: May 10, 2011

(54) METHOD FOR ENHANCEMENT OF A WIND PLANT LAYOUT WITH MULTIPLE WIND TURBINES

(75) Inventor: Chris Henry Gundling, Greenville, SC (US)

(73) Assignee: General Electric Company, Schenectady, NY (US)

( * ) Notice: Subject to any disclaimer, the term of this patent is extended or adjusted under 35 U.S.C. 154(b) by 19 days.

(21) Appl. No.: 12/433,020

(22) Filed: Apr. 30, 2009

(65) Prior Publication Data

US 2010/0138201 A1 Jun. 3, 2010

(51) Int. Cl.
G06G 7/48 (2006.01)
(52) U.S. Cl. .......................................................... 703/6
(58) Field of Classification Search .................. 703/6
See application file for complete search history.

(56) References Cited

U.S. PATENT DOCUMENTS

2009/0295165 A1* 12/2009 Giguere et al. ................. 290/55

FOREIGN PATENT DOCUMENTS

WO WO 2008/092462 8/2008

OTHER PUBLICATIONS

Hans Georg Beyer et al., "Modelling tools for wind farm upgrading", 1996, Proceedings of the EUWEC, four unnumbered pages.*
Pascal Oberti et al., "Wind farms territorial integration in Corsica: methodology and case study in Bonifacio", 2006, First international Symposium on Environment Indentities and Mediterranean Area 2006, pp. 178-183.*
U. Aytun Ozturk et al., "Heuristic methods for wind energy conversion system positioning", 2004, Electric Power Systems research, vol. 70, pp. 179-185.*
Kirk Martin, "Site specific optimization of rotor/generator sizing of wind turbines", 2006, Georgia Institute of Technology, pp. 1-103.*
S.A. Grady et al., "Placement of wind turbines using genetic algorithms", 2005, Renewable Energy, vol. 30, pp. 259-270.*
T. Diveux et al., "Horizontal axis wind turbine systems: optimization using genetic algorithms", 2001, Wind Energy, vol. 4, pp. 151-171.*
P. Fugslang et al., "Site-specific design optimization of wind turbines", 2002, Wind Energy, vol. 5, pp. 261-279.*
Jose Castro Mora et al., "An evolutive algorithm for wind farm optimal design," 2007, Neurocomputing, vol. 70, pp. 2651-2658.*
Christopher N. Elkinton et al., "Optimizing the layout of offshore wind energy systems," 2008, Marine Technology Society Journal, vol. 42, No. 2, pp. 19-27.*
U.S. Appl. No. 12/130,509, filed May 30, 2008.

* cited by examiner

Primary Examiner — Jason Proctor
Assistant Examiner — Russ Guill
(74) Attorney, Agent, or Firm — Dority & Manning, PA (57) ABSTRACT

The layout and configuration of wind turbines in a wind power plant includes identifying constraints of a power plant site and defining at least one region in the site for placement of a plurality of wind turbines. The wind state at the region in the site is determined. An actual wind condition at the various possible wind turbine locations within the site is determined by modeling the wind state with wake effects at the respective wind turbine locations. Individual wind turbine configuration and location within the region is then selected as a function of the actual wind conditions each of the individual wind turbine locations to optimize power output of the individual wind turbines. The selection of turbine configuration includes selection of a turbine hub height that minimizes wake loss of the individual wind turbines as a function of the actual wind conditions predicted for the turbine location.

9 Claims, 6 Drawing Sheets

Fig. 7 ns for Enhancement of a Wind
METHOD FOR ENHANCEMENT OF A WIND PLANT LAYOUT WITH MULTIPLE WIND TURBINES

FIELD OF THE INVENTION

The present invention is directed generally to wind turbines, and more particularly to a method for enhancing an initial layout of multiple wind turbines in a wind plant.

BACKGROUND

Wind turbines are receiving increased attention as an environmentally safe and relatively inexpensive alternative energy source. With this growing interest, considerable efforts have been made to develop wind turbines and wind turbine plants that are reliable, efficient, and cost-effective.

Placement of wind turbines within a wind power plant has traditionally been performed with the single objective of maximizing overall energy production from the plant. For example, in designing the wind plant, wind turbines are initially placed at locations within the geographic boundaries of the plant having the highest winds based on a wind resource grid. A wind resource grid can be generated using commercially available wind resource assessment or modeling software such as WindPro™ (available from EMD International A/S, Aalborg, Denmark), WindFarmer™ (available from Garrad Hassan, Bristol United Kingdom), or WindFarm™ (available form ReSoft Ltd., Banbury, United Kingdom). Other design criteria or constraints, such as exclusion zones, minimum spacing constraints, noise restrictions, and the like, are then used to adjust the turbine layout.

Other wind plant design objectives, such as minimizing the cost of the wind plant, maximizing financial metrics, and minimizing noise, may also be taken into account in designing the plant layout. Various commercial software programs may be helpful in this regard. For example, to address cost, financial metrics, and noise constraints, software such as WindPro™, WindFarmer™, or WindFarm™ offer analysis modules that can be used to manually adjust the turbine layout as desired. In addition, these programs may offer a function or module allowing for the automatic maximization of energy production for a fixed number of wind turbines and a particular wind turbine model/configuration. Noise constraints and exclusion zones may also be considered in these programs. Even with the available software programs, additional analysis is needed before the turbine layout can be finalized, such as the calculation of the mechanical loads on each wind turbine to ensure that they are within the design limits of the wind turbine model(s)/configuration(s) of interest.

The published PCT application WO 2008092462 describes a method for designing a wind plant wherein at least one group of wind turbines within the plant are selected to produce a non-optimal output as compared to another group of wind turbines for the same wind conditions in order to achieve a more even output for the entire plant. For example, a first group of wind turbines utilized in the plant are designed to produce a maximized output in a particular wind climate. This first group is supplemented by a second group of wind turbines that is specifically designed to produce a maximal power in lower wind speeds, and thus achieve their rated power in another window of the wind spectra as compared to the first group. The goal of the design is to increase the total power output of the plant across a broader spectra of wind conditions by having groups of wind turbines with rated power outputs at different wind speeds.

The commercially available wind plant programs, and the methodology described in the WO 2008092462 publication, have the disadvantage that they view the wind plant as a single power producing unit subjected to an overall site condition, rather than a cluster of individual turbines subjected to unique wind conditions. The conventional design methodologies typically require an initial baseline layout wherein the types of turbines and overall site conditions are already established or assumed. Thus, the methodology is constrained from the very beginning. The conventional methods do not allow for consideration of the unique wind conditions experienced by each individual wind turbine within the plant, and thus do not consider that the individual turbine output can be increased by tailoring individual wind turbine characteristics, such as hub height, turbine types, and so forth, to the actual wind conditions experienced at each wind turbine location.

Therefore, what is needed is a wind plant design methodology that maximizes the plant's annual energy production (AEP) by tailoring individual turbine characteristics to differing wind conditions that are experienced through the plant.

BRIEF DESCRIPTION OF THE INVENTION

Aspects and advantages of the invention will be set forth in part in the following description, or may be obvious from the description, or may be learned through practice of the invention.

In accordance with aspects of the invention, a method is provided for determining a wind turbine layout in a wind power plant wherein a plurality of wind turbines generate a combined power output. The method includes identifying any manner of constraint of a wind power plant site, and defining at least one region in the site for placement of a plurality of wind turbines. The wind state at the region is assessed by any conventional method, such as historical data, wind assessment programs, and the like. Once the initial wind state is determined, the method includes predicting actual wind conditions at the possible locations in the region identified for placement of wind turbines by modeling the wind state with wake effects at the respective locations, the wake effects resulting from cumulative placement of other wind turbines at the various locations in the region, or in other regions at the site. Individual wind turbine configurations and locations within the region are then determined as a function of the calculated actual wind conditions at each individual location to increase power output of the individual wind turbines. The selection of turbine configuration includes selection of a turbine hub height that minimizes wake loss of the individual wind turbines taking into consideration the predicted actual wind conditions at the turbine locations.

The present invention also encompasses a wind power plant that is configured in accordance with the principles embodied herein. The wind power plant includes a power plant site comprising at least one region having a plurality of wind turbines at respective turbine locations configured for generation of a combined power output. The wind turbines have a location and a configuration relative to each other determined as a function of actual wind conditions at each turbine location, the actual wind conditions being a function of wind state at the site and wake effects at the respective turbine locations resulting from cumulative placement of other wind turbines in the region. The wind turbines within the region have varying hub heights so as to increase power output of the individual wind turbines for the determined actual wind conditions at the respective turbine location, the varying hub heights determined as a function of actual wind conditions at the respective wind turbine locations calculated by modeling the wind state at the region with wake effects that result from cumulative placement of other wind turbines at various locations in the region. The varying turbine hub heights are selected to decrease wake loss of the individual wind turbines.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 1:
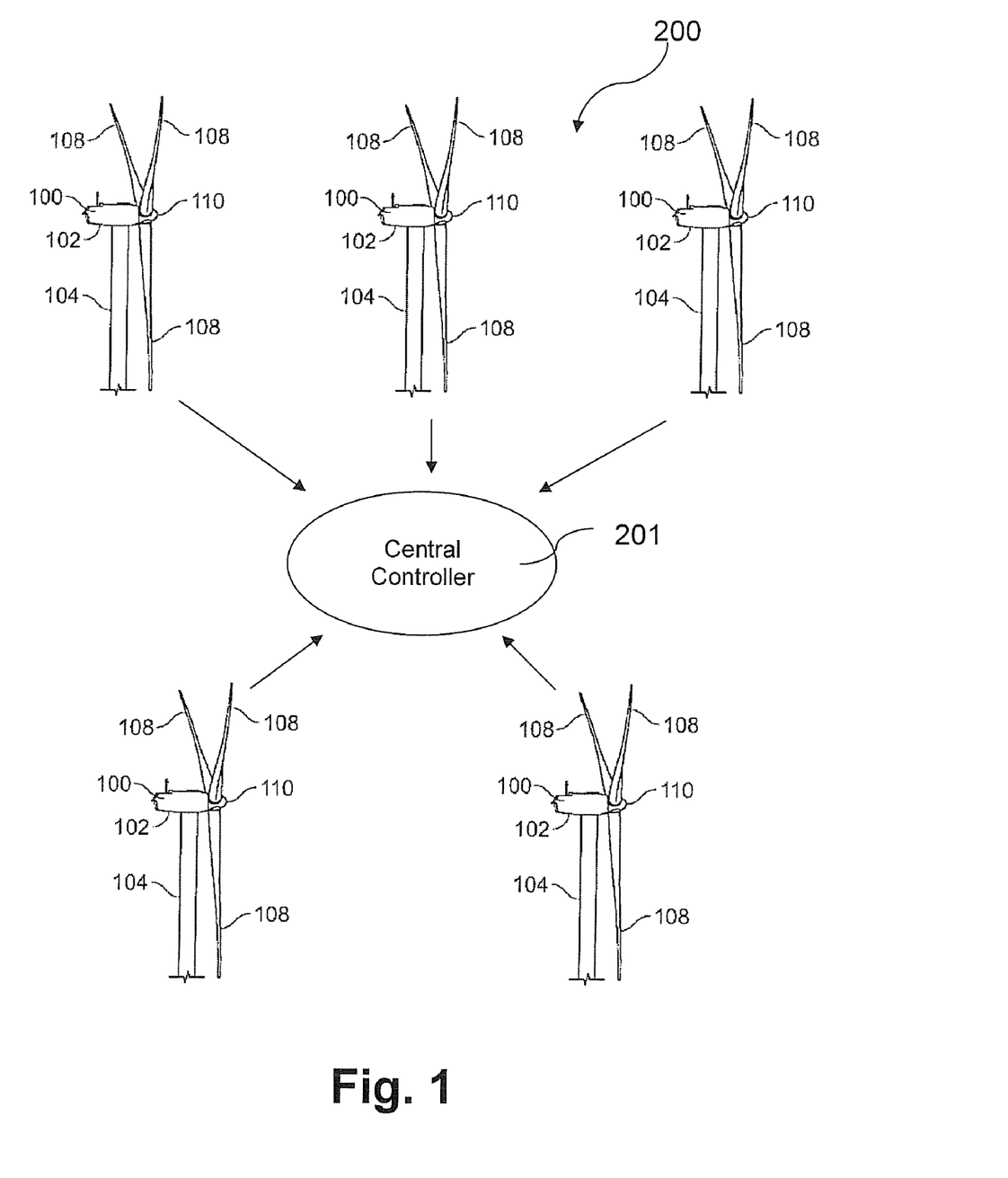
FIG. 1 is a schematic view of a wind power plant according to aspects of the present invention.

As shown in FIG. 1, a wind power plant 200 includes a number of wind turbines 100. Each turbine 100 generally comprises a nacelle 102 housing mounted atop a tower 104. The nacelle 102 generally includes a generator, controller, and other associated equipment. The height of the tower 104 is selected based upon various factors, as described in greater detail below, and may extend to heights up to 60 meters or more. The wind turbines 100 may be installed on any terrain providing access to areas having desirable wind conditions. The terrain may vary greatly and may include, but is not limited to, mountainous terrain or off-shore locations. The wind turbines 100 also comprise a rotor 106 that includes one or more rotor blades 108 attached to a rotating hub 110. There are no specific limits on the number of rotor blades 108 required by the present invention.

The plurality of wind turbines 100 are preferably controlled and/or monitored from a central controller 201. Signals 203 may be transferred to and/or from the wind turbines 100 to provide monitoring data and/or control signals. The number of wind turbines 100 in the plant 200 is not a limiting factor, but is generally dictated by a combination of considerations. The wind power plant 200 is arranged to provide a combined power output.

Figure 2:
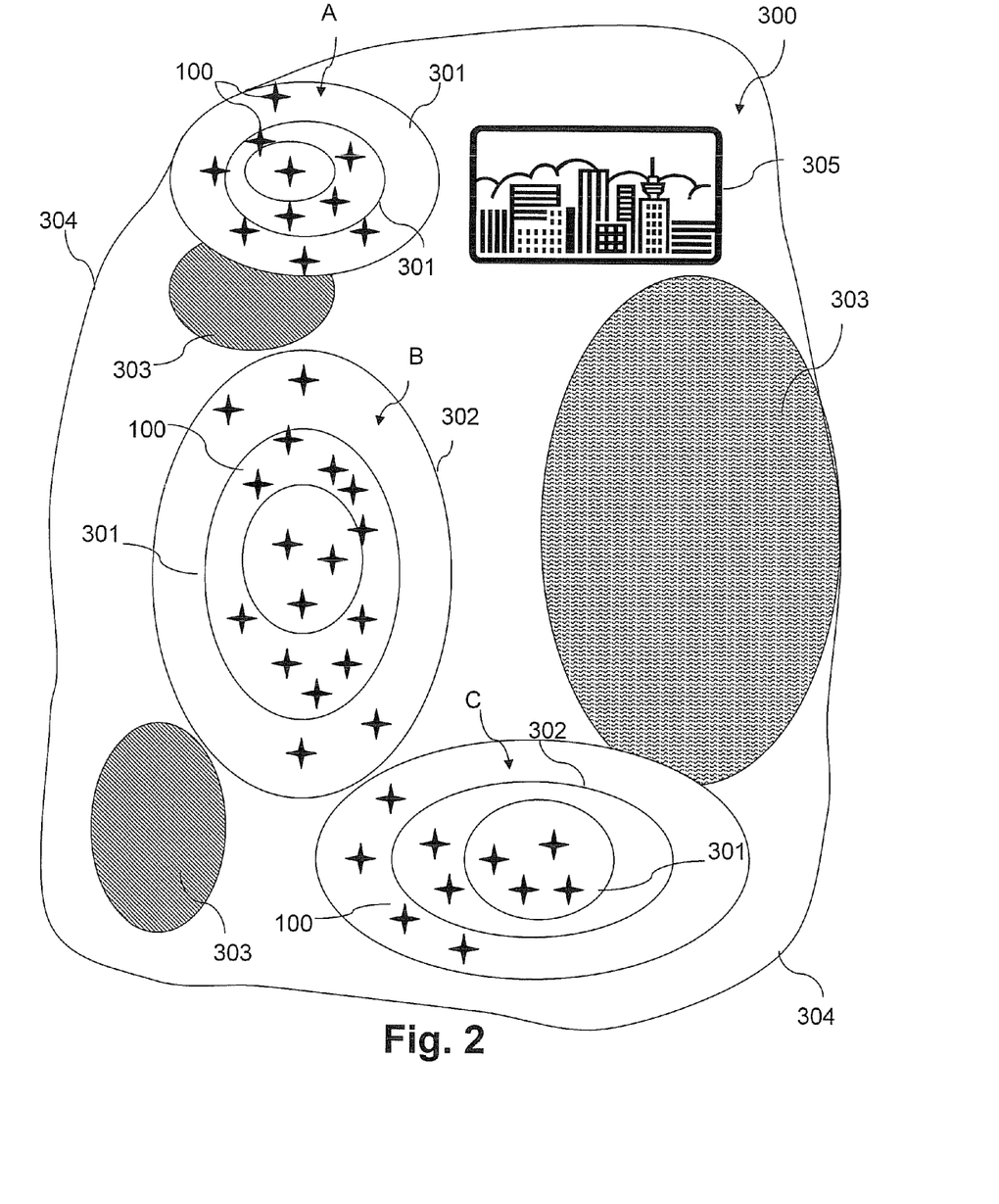
FIG. 2 is a plan view of a wind power plant on a site deemed suitable for wind turbines according to aspects of the invention.

Referring to FIG. 2, a wind power plant is illustrated at a wind turbine site 300 bounded by boundary line 304. The site 300 includes a plurality of wind turbines 100 arranged therein. The site 300 includes one or more distinct regions. In the illustrated embodiment, regions A, B, and C are designated. The regions A-C may be defined by any combination of factors, but each region generally designates an area within the site 300 wherein a plurality of turbine locations are subjected to common wind conditions and constraints. Each of regions A-C includes a plurality of wind turbines 100 arranged on a variety of topography. The topography includes elevation contour lines 301 delineating changes in elevation within site 300 or a given region. The surface roughness is indicated by lines 302 and represents the ground cover and its influence on the wind conditions within the respective region A-C. An important topography consideration is the presence of significant dwellings or industrial buildings, such as a nearby city or residential area 305.

The site 300 may include any manner of exclusion zone 303, which may be a lake, unstable soil, inhospitable terrain, protected land region, or other area on which a wind turbine cannot be located for any reason. Further, the site 300 may include or be in close proximity to noise sensitive areas, such as the area 305, which may include homes, businesses, natural reserves, or other areas that are sensitive or intolerant to noise or close proximity to wind turbines 100. It should be appreciated that the exclusion zones 303, including noise sensitive areas 305, can include any area that is sensitive or intolerant to the presence of wind turbine 100s, the wind turbine structure (e.g., tower 104), or the associated structures or support components of a wind power plant (e.g., access roads or protective fences, migratory bird paths, habitat area reduction concerns for various animals, etc.), noise generated from a wind power plant, or any other factor related to the presence of a wind power plant.

In accordance with aspects of the invention, a methodology is provided for determining a wind turbine layout at a wind power plant site 300 wherein a plurality of wind turbines 100 generate a combined power output. Referring to the flow diagram of FIG. 3, the methodology includes identifying any manner of constraint on the power plant site at step 400. As discussed above, such constraints may include defined exclusion zones 303, noise sensitive areas, 305, and generally any area within or near the site 300 that is sensitive or intolerant to the presence of wind turbines 100.

Figure 4:
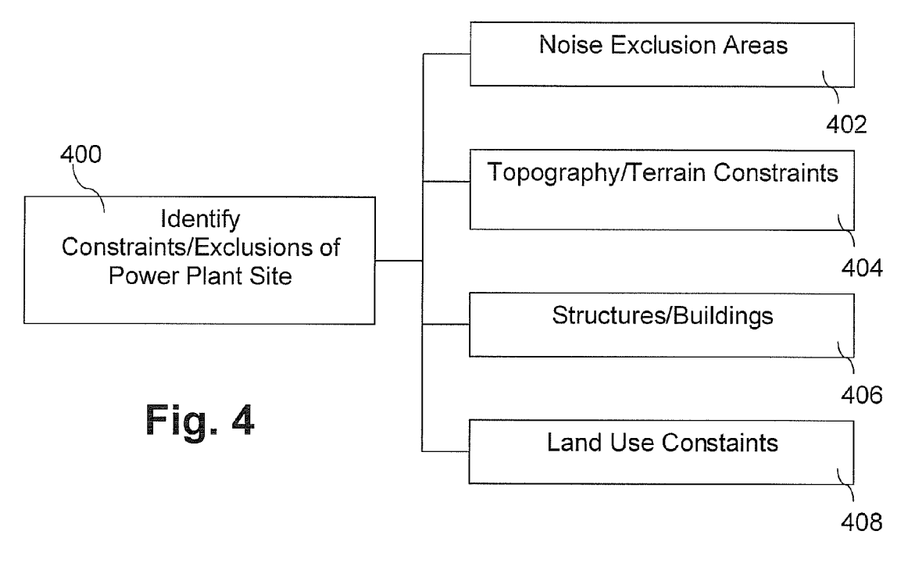
FIG. 4 is a more detailed flow diagram of one of the process steps from FIG. 3.

FIG. 4 represents a more detailed flow process of step 400 for identifying the constraints and exclusions of a particular power plant site, and presents a non-exhaustive list of factors that may be considered in identifying such constraints or exclusions. For example, step 402 represents consideration of any noise exclusion areas within or near the site 300. Step 404 represents consideration of topography and terrain constraints within the site 300 that may limit placement or grouping of wind turbines 100. Step 406 represents consideration of structures, buildings, residential neighborhoods, and the like that may prohibit placement of wind turbines 100. Step 408 represents consideration of any manner of land use constraints within or near the site 300.

Figure 3:
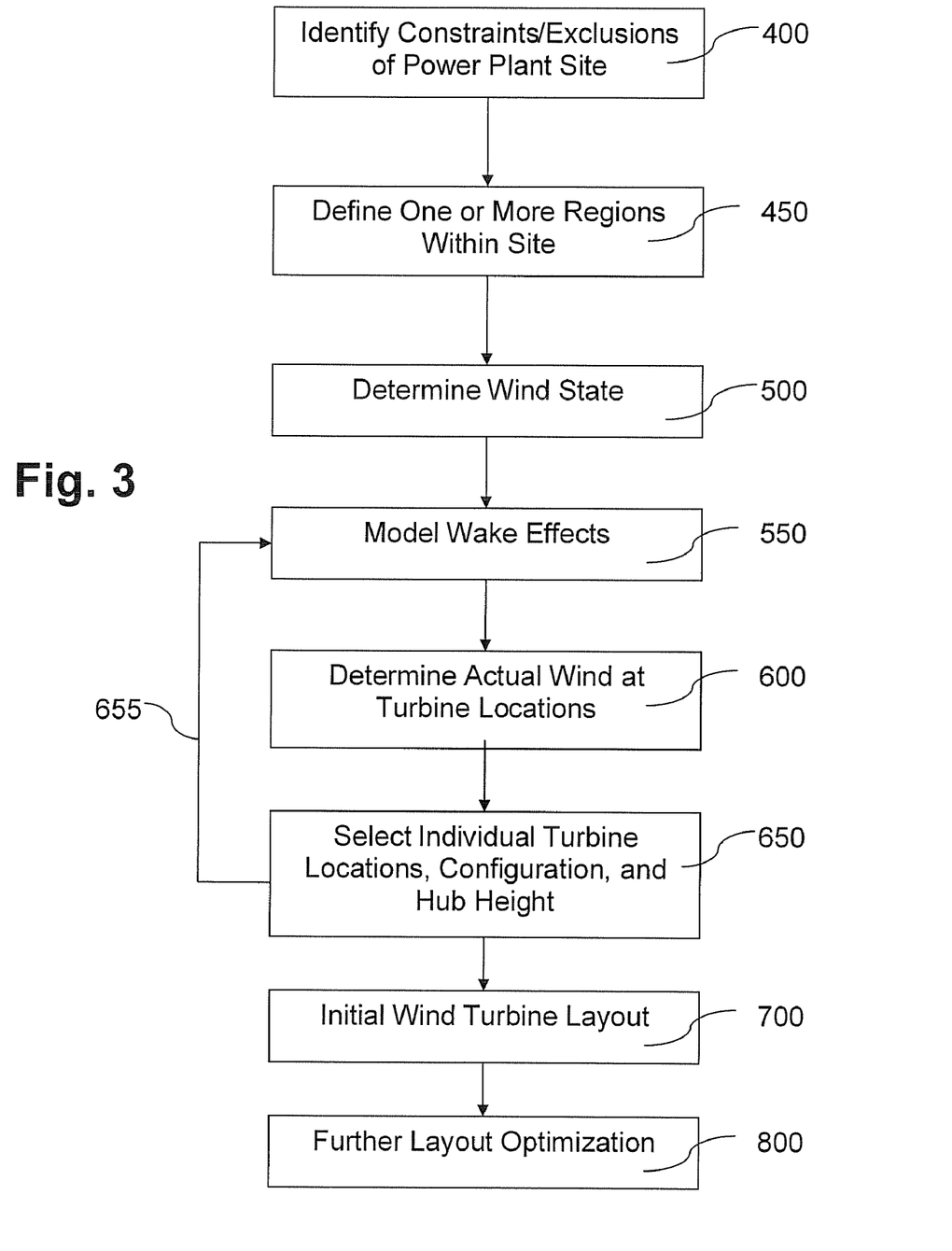
FIG. 3 is an overall process flow diagram according to a method embodiment of the invention.

Once the constraints of the plant site have been determined, at least one or more regions within the site are defined at step 450 (FIG. 3). As discussed above with reference to FIG. 2, these distinct regions A, B, and C may be defined by any combination of factors, with each region generally designating an area within the site 300 wherein a plurality of turbine locations are subjected to common wind conditions and constraints. It should be appreciated that the site 300 may include only one region, or may include a plurality of regions, as illustrated in FIG. 2. Each of the regions A-C includes a plurality of possible wind turbine locations arranged on the topography and terrain of the respective region.

Figure 5:
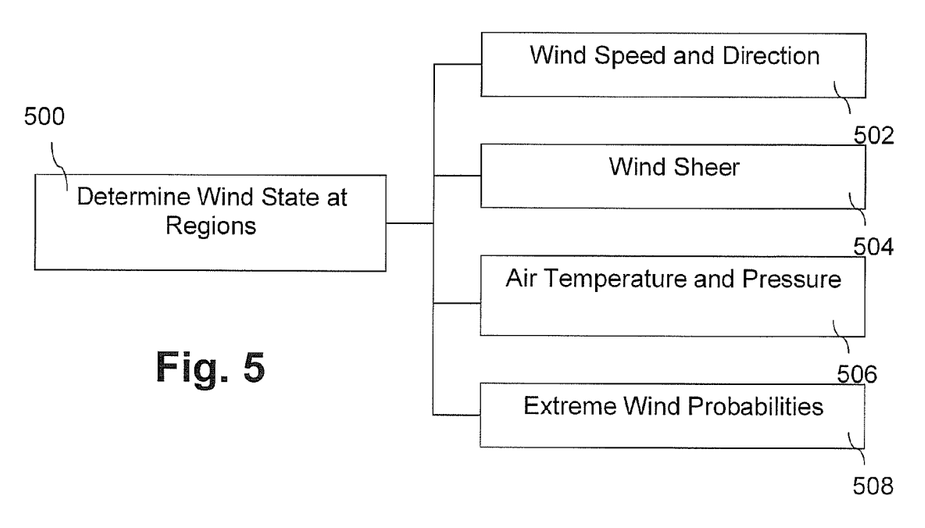
FIG. 5 is a more detailed flow diagram of one of the process steps of FIG. 3.

At step 500 in FIG. 3, the wind state is determined for each of the identified regions. Referring to FIG. 5, any factor may be considered in predicting the anticipated wind state at the regions. For example, step 502 illustrates consideration of wind speed and direction at a particular region. Step 504 represents consideration of wind shear at the respective regions. Step 506 indicates consideration of air temperature and pressure at the particular regions. Step 508 represents consideration of extreme wind probabilities determined for the regions. It should be appreciated that the wind state at any given region, or the site overall, can be determined by any conventional method known and used by those skilled in the art, including the use of commercially available software programs, historical meteorological data, and any other type of tool or information available for developing an accurate wind resource assessment of the site 300 and distinct regions A-C in particular. It should also be appreciated that the steps and factor illustrated in FIG. 5 are non-exhaustive, and that any number of additional factors or considerations may be taken into account in determining the wind state at the respective regions.

Referring again to FIG. 3, once the wind state at the particular region has been determined, at step 550 the wind state is modeled with wake effects at the various turbine locations within each region. A wake modeling algorithm or program may be utilized to predict the cumulative wake effect experienced by the individual turbines within a given region. The wake effects are the result of cumulative placement of other wind turbines within the region at the various identified locations, and will affect the actual wind conditions experienced by a wind turbine 100 at any one of the respective locations. Initial modeling of the wake effects may be premised on a uniform rotor height for all of the turbines within the region. Wake modeling theories are known and used in the art, and include, for example, the Jensen Model and the Ainslie Model. WindFarmer™ incorporates an Eddy Viscosity wake model (based on the Ainslie Model), while WindPro™ utilizes the Park wake model (based on the Jensen Model). The wake modeling functions of these programs, or similar programs, may be used in practice of the present invention.

Figure 6:
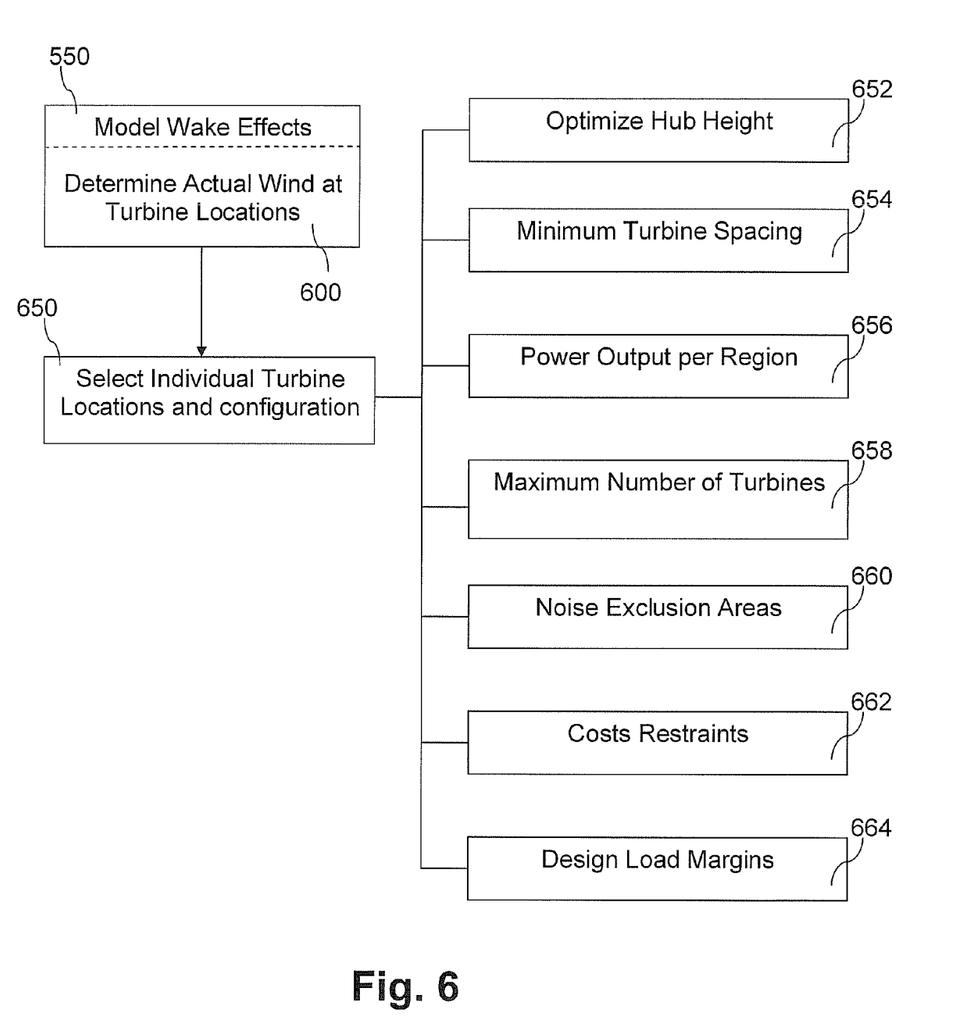
FIG. 6 is a more detailed flow diagram of aspects of the flow process of FIG. 3.

Once the wake effects have been modeled, an actual wind is calculated or determined for each of the turbine locations within a region at step 600 in FIG. 3 and FIG. 6. The wake effects are applied to the determined wind state to predict the actual wind conditions at the respective turbine locations.

At step 650 in FIG. 3, once the actual wind at the respective turbine locations is calculated, individual wind turbine configurations and locations within the region are determined at step 650. At each identified wind turbine location within the region, a wind turbine configuration is selected to enhance output of a wind turbine at the location. This process includes selection of a turbine hub height that minimizes wake loss of the individual wind turbine at a particular location as a function of the actual wind conditions predicted for the turbine location. Because adverse wake effects are factored into the determination of actual wind conditions at the respective turbine locations, a turbine rotor hub height can be selected to minimize wake losses.

It should be appreciated that as turbine hub heights are selected for the various turbine locations within a region, the actual wind conditions at the remaining locations may vary as a result of changing wake effects. For example, the wake effects may have been initially modeled based on a uniform rotor hub height. As the hub heights change, so may the wake effects. Accordingly, it may be desired to model the wake effects for the remaining turbine locations after changing one or more turbine rotor hub heights. This process is illustrated by the arrow 655 in FIG. 3.

Referring to FIG. 6, it should be appreciated that any number of turbine configuration factors may be additionally considered. For example, step 652 represents required selection of a turbine rotor hub height to minimize adverse wake effects, as discussed above. Step 654 represents consideration of a minimum turbine spacing requirement within a particular region. Step 656 represents consideration of the power output required of the particular region, which will affect the size or number of turbines within the region. Step 658 represents consideration of the maximum number of turbines that can be located within any given region, which may be a factor of the minimum turbine spacing requirement of step 654 and power output per region of step 656. Step 660 represents consideration of noise exclusion areas that are near the region that may prohibit or limit placement of turbines of a particular size or power output. Step 662 represents consideration of cost and any other financial restraint that may affect the type, number, and configuration of turbines within the region. Step 664 represents consideration of the design load margins of any given wind turbine, and the combined affect of the load margins on satisfying the power output of the region. It should be appreciated from FIG. 6 that any number or combination of factors may be considered in addition to selection of a turbine hub height that minimizes wake loss of an individual wind turbine in the final configuration of the respective turbines.

Referring again to FIG. 3, once all of the individual turbine configurations have been determined, an initial wind turbine layout plan is generated for the site 300 at step 700. This initial wind turbine layout plan thus treats each of the regions within the site as a cluster of individual turbines, with the configuration of each of the turbines determined to maximize the power output of the individual turbines as a function of actual wind conditions, including a particular rotor hub height that minimizes adverse wake effects.

Figure 7:
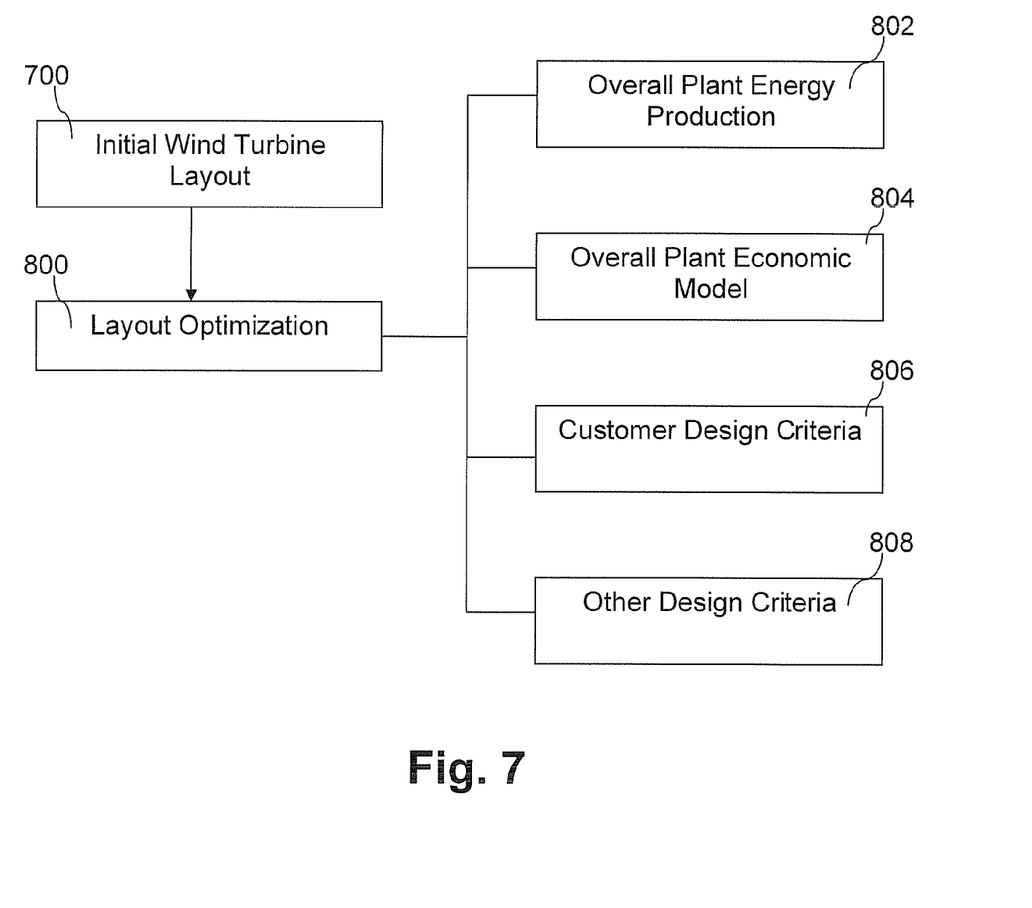
FIG. 7 is a more detailed flow diagram of aspects of the flow process of FIG. 3.

At step 800 in FIG. 3 and FIG. 7, the initial wind turbine layout plan generated in accordance with aspects of the present invention may serve as a final site plan, or may serve as the basis for further processes. For example, the initial plan generated herein may serve as the base plan for further utilization by one of the commercially available programs, such as the WindPro™, WindFarmer™, or WindFarm™ programs discussed above in the Background section this disclosure. Further enhancement may include consideration in step 802 of overall plant energy production needs, and an overall plant economic model in step 804. Customer design criteria may be considered in step 806, as well as any other design criteria in step 808. It should be appreciated that further enhancement of the initial wind turbine layout plan is not limited by any number or combination of criteria.

The present invention also encompasses a wind power plant wherein placement of the wind turbines and configuration of the wind turbines within the plant are accomplished with the methodology described herein. Thus, in this regard, the invention encompasses a wind power plant of the type illustrated in FIG. 2 wherein at least one region within the site 300 is configured in accordance with the present methodology.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for determining a wind turbine layout in a wind power plant wherein a plurality of wind turbines generate a combined power output, said method comprising:

identifying constraints of a power plant site and defining at least one region in the site for placement of a plurality of wind turbines;

determining wind state at the region in the site;

determining actual wind conditions at possible locations in the region by modeling the wind state with wake effects at the respective locations with a wake modeling program executed on a computing device, the wake effects resulting from cumulative placement of other wind turbines at various locations in the region; and selecting individual wind turbine configuration and location within the region as a function of actual wind conditions at each individual location to enhance power output of the individual wind turbines, the selection of turbine configuration including selection of a turbine hub height that minimizes wake loss of the individual wind turbines as a function of the actual wind conditions at the turbine locations to increase the power output of the individual wind turbines; and generating a wind turbine layout plan based on individual wind turbine configuration and location.

2. The method as in claim 1, wherein the step of identifying constraints of the site comprises consideration of factors that define exclusion areas within the site for placement of wind turbines.

3. The method as in claim 1, wherein the step of determining wind state at the region comprises assessment of any combination of wind speed, wind direction, wind shear, wind turbulence intensity, air density, and meteorological conditions.

4. The method as in claim 1, wherein the number of wind turbines within the region is determined as a function of any combination of minimum required spacing between individual turbines, design load margins of the selected turbine configurations, power output requirements for the region, and cost constraints.

5. The method as in claim 1, wherein the step of selecting turbine configuration further comprises selection of any combination of rotor area, rotor blade profile, rotor blade pitch, turbine controls, and design load margins.

6. The method as in claim 1, further comprising applying additional design criteria to the wind turbine layout after selection of the individual turbine locations and configurations for further refinement of the power plant.

7. The method as in claim 1, wherein a plurality of different regions are identified in the site, and the steps of determining wind state at the region, determining actual wind conditions at the turbine locations, and selecting individual wind turbine configuration and location within the region as a function of actual wind conditions at each individual location are performed in each of the regions.

8. The method as in claim 7, wherein the step of determining actual wind conditions comprises modeling the wake effects resulting from turbines in other regions in the site that affect actual wind conditions at a different respective region.

9. The method as in claim 1, further comprising using the selected wind turbine locations and configurations as an initial wind turbine layout in a subsequent power plant enhancement.

* * * * *